July 29, 1941.  A. C. DONOVAN, JR  2,250,928
SIGNALING SYSTEM
Filed May 5, 1939

Witness
Paul F. Bryant

Inventor
Arthur C. Donovan, Jr.
by his attorneys
Fish Hildreth Cary & Jenney

Patented July 29, 1941

2,250,928

UNITED STATES PATENT OFFICE 2,250,928

SIGNALING SYSTEM

Arthur C. Donovan, Jr., Brookline, Mass., assignor to The Gamewell Company, Newton Upper Falls, Mass., a corporation of Massachusetts Application May 5, 1939, Serial No. 271,881

8 Claims. (Cl. 177—367)

The present invention relates to signaling systems, such as fire alarm systems, and more particularly to systems of the general type disclosed in the patent to Bridges No. 2,056,709 granted October 6, 1936.

The system described in the Bridges patent comprises in general a normally closed loop energized by direct current, together with emergency ground signaling means energized by alternating current. The system is adapted for use with a wide variety of types of boxes and circuit connections, the principal purpose being to permit transmission of signals by means of the emergency alternating current ground circuit under various adverse conditions, such as breaks in the loop, ground faults, etc., all as completely described in the patent.

In a system of this type, there is a considerable circulating current in the ground circuit, even under "open" or non-signaling conditions. This follows from the fact that the loop conductor has an admittance to ground, due to its distributed capacitance and conductance. Under some circumstances, the ratio of ground signal current to circulating current may be insufficient to permit the emergency manifesting devices to distinguish reliably between them.

According to the present invention, means are provided for preventing energization of the emergency manifesting means under so-called open circuit conditions. In the best form of the invention yet devised, the manifesting devices are supplied with a potential of such magnitude as to prevent the passage of ground current therethrough under normal conditions, even though ground currents are circulating in the system as a whole. The operation of grounding a box sufficiently unbalances the system to permit the manifesting devices to operate. The manifesting devices are therefore relieved of the necessity of distinguishing between small differences of current magnitude, and may be made to respond reliably only to signaling currents.

Figure 1:
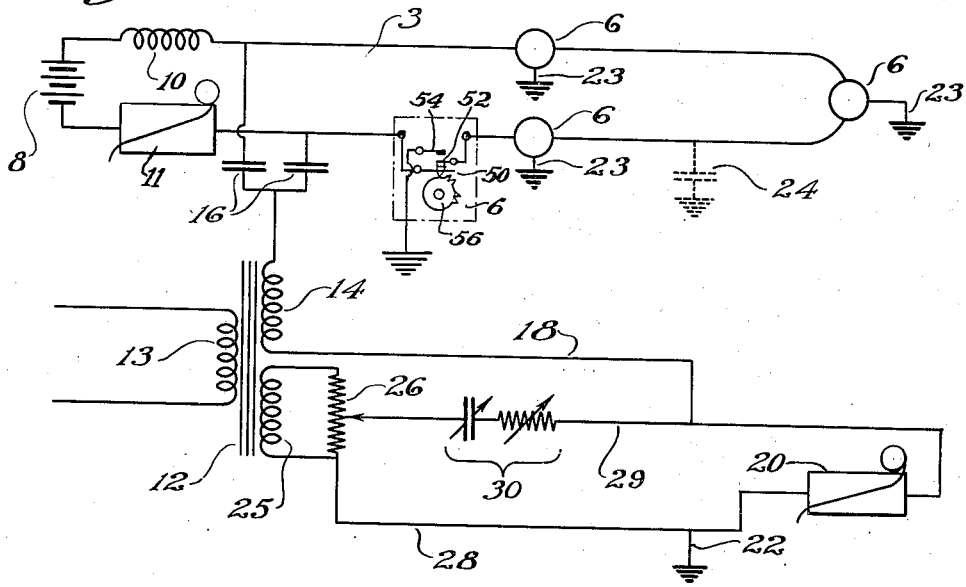
Figure 2:
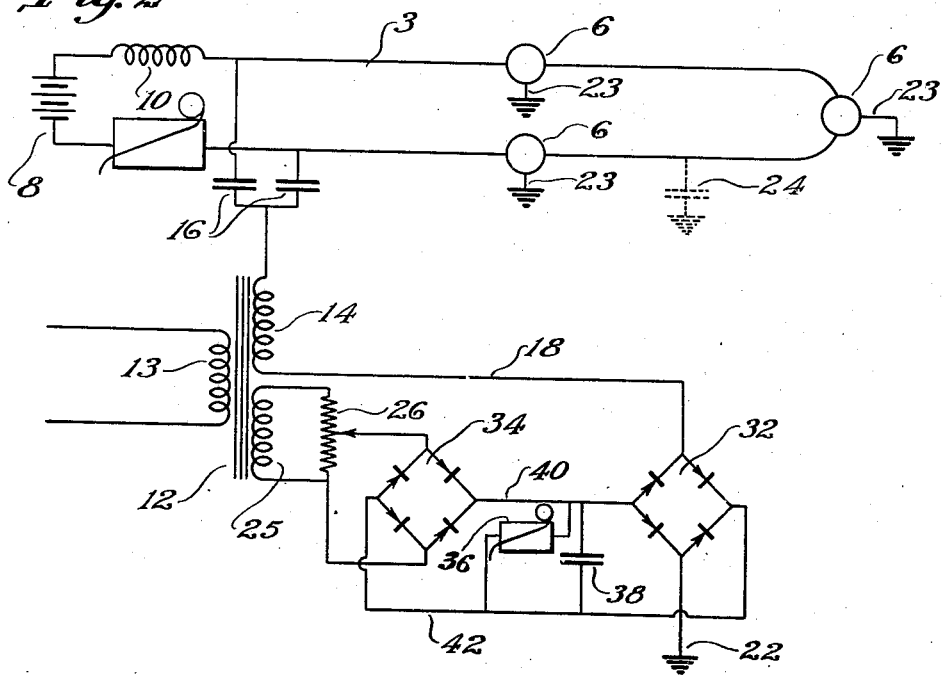

In the accompanying drawing Fig. 1 is a diagram of a signaling system according to the present invention; and Fig. 2 is a diagram of a modified, and in some respects preferable, system.

The system shown in Fig. 1 comprises a single box circuit 3 including a number of signal formulating devices, illustrated as fire alarm boxes 6, in series. The box circuit forms a closed loop continuously energized by a direct current battery 8 through an inductance coil 10, which is of sufficient impedance to prevent the passage of any appreciable alternating current through the battery. A direct current manifesting device, shown as a recorder 11, is included in the loop.

A ground signaling circuit is provided by means of a transformer 12, having a primary winding 13, and a secondary winding 14, one terminal of which is connected to opposite sides of the loop through condensers 16 which serve to keep direct current out of the local alternating current circuit. The other terminal of the secondary is connected by a wire 18 to an alternating current manifesting device 20, which in turn is connected to ground as indicated at 22. The manifesting device 20 is here illustrated as a recorder, but it may comprise any suitable register, alarm, relay, or other device adapted to be operated when a complete ground circuit is established.

As described in the Bridges patent, each of the boxes 6 has means, illustrated diagrammatically at 23, for connection to ground. The boxes may be of various types. In some forms of boxes the ground connection is made and broken on each signaling impulse regardless of the condition of the line, so that signals are always transmitted over both the main and ground circuits. In Fig. 1 is illustrated a box of this type having normally closed contacts 50, 52 connected in the line, and a contact 54 connected with ground. During a signaling operation, all three contacts are connected when contact 50 is lifted by a tooth on the code wheel 56 and disconnected when contact 52 descends after passing over the tooth. In other types of boxes the grounding means is inoperative except under abnormal conditions, in which case transmission of signals through the emergency circuit is possible only after detection of a fault in the line. For the purposes of the present invention, the illustration of a particular type of box is diagrammatic only.

The parts thus far described constitute a simple system of the Bridges type, and the operation of the ground circuit will be explained before proceeding further with the description of the present invention. The ground circuit will be considered in both its "closed" and "open" conditions. The circuit may be said to be closed when a ground connection 23 is made at any box or when a ground fault exists on the line, and may be said to be "open" or "normal" when no such ground connection exists.

In the closed condition of the emergency circuit, the complete circuit is traced from the transformer 14 through the coupling condensers 16, the conductors of the loop, the ground connection 23 at a box, the manifesting device 20, and finally the wire 18 back to the secondary 14.

In the normal or open condition, when no ground 23 is established, a current nevertheless flows through the manifesting device because of the admittance of the line with respect to ground (represented by the condenser 24 in dotted lines). The circuit is traced in exactly the same manner except that the path 24 is substituted for the zero-resistance connection 23. The manifesting device must therefore be called upon to distinguish between a "closed-circuit" current caused by the establishment of a physical ground 23, and a "normal" or "open-circuit" current which flows through the path 24. The effect of making a ground connection 23 at a box is simply to shunt the path 24. Because of the considerable series impedance of other parts of the circuit, the signaling current through a connection 23 may not differ greatly in magnitude from the normal current through the path 24. There is an additional difficulty in that the so-called normal current may vary somewhat because of changes of admittance of the path 24 under varying atmospheric conditions, and the signaling current will itself vary depending on the distance of the active box from the central station.

According to the present invention, the effect of the normal ground current is balanced out so that the manifesting device is not subject to possible energization under normal or open-circuit conditions. In Fig. 1 this is accomplished by a balancing or compensating circuit energized by an additional voltage source, preferably a tertiary winding 25 of the transformer, across which is connected a potentiometer 26. The balancing circuit comprises a connection 28 between one end of the transformer and the grounded terminal 22 of the manifesting device, and a connection 29 between the variable arm of the potentiometer and the other terminal of the manifesting device. An adjustable impedance 30, herein illustrated as a variable condenser and resistor in series, is included in the connection 29.

In operation the potentiometer 26 and the impedance 30 are adjusted to maintain a substantially zero potential difference between the terminals of the manifesting device under normal conditions. To accomplish this it is necessary for the balancing circuit to carry a current which is equal to the normal ground circulating current of the system, both in magnitude and phase. Consequently, a proper adjustment of both the potentiometer and the series impedance is necessary. The proper adjustment having been obtained, the path of normal current flow may be traced from the transformer secondary 14 through condensers 16, the conductors of the loop, the distributed capacitance 24, the ground path, the balancing circuit (28, 25, 26, 29) and wire 18 back to the secondary 14, no current passing through the manifesting device 20. Upon an emergency signaling operation, however, in which a physical ground is established at one of the boxes, or in case the loop itself becomes actually grounded, the system becomes unbalanced and a signal current flows through the manifesting device 20. The device 20 is therefore not called upon to distinguish between currents of nearly equal magnitude, but the adjustment may be made to respond only to substantial currents, such as arise from unbalance of the system, without being liable to give a false indication due to passage of normal leakage currents.

In order to avoid the necessity for a phasing adjustment, the system of Fig. 2 is preferred, in which a manifesting device responsive to direct current is employed. This is in itself an advantage since direct current relays, registers, alarm devices, etc., have a greater inherent reliability. The system of Fig. 2 is similar to that of Fig. 1 except that full-wave rectifiers 32 and 34 are used in the alternating current circuits. The wire 18 and the ground connection 22 are connected to two diagonally opposite corners of the rectifier 32, and the direct current manifesting device, here indicated at 36, is connected to the other two corners. A smoothing condenser 38 is preferably connected across the manifesting device. The teritary winding 25 is provided with the potentiometer 26, as in the circuit of Fig. 1, and the terminals of the potentiometer are connected to two diagonally opposite corners of the rectifier 34, the other two corners being connected by wires 40 and 42 with the terminals of the manifesting device 36. In this arrangement it is necessary to balance for magnitude only and this is accomplished by means of the potentiometer 26. The circuits for both the normal and signaling conditions are traced exactly as before, except that through the provision of the rectifier unit current can flow in only one direction through the device 36. Under normal or open conditions the system may be balanced so that the device 36 carries substantially zero current whereas a substantial current will flow if the line is physically grounded, as at a box during a signal formulation.

Aside from the advantage of neutralizing the normal current, the present invention provides the means of supervising the central station alternating current equipment. The manifesting device will respond to any substantial unbalance of the system. Hence if the connection 18, for example, becomes broken, the manifesting device will be operated through the tertiary circuit alone and an alarm will be given.

It will be understood that in its best embodiment the system is completely balanced, so that the current flow through the manifesting device under normal or open conditions is exactly zero and the device may then be made sufficiently sensitive to respond to unbalanced currents of substantially any magnitude. However, since the admittance of the line to ground may vary somewhat from time to time a perfect balance cannot be expected at all times, and is, in fact, not necessary. The important factor is that the ratio of signal current to normal current through the manifesting device shall be fairly large, and this result is obtained according to the present invention by holding the normal current to a value which is nearly, if not exactly, zero.

Although a single circuit system has been shown and described, it will be understood that the invention may be applied to any number of individual box circuits of a multiple circuit system. Furthermore, the invention is not limited to the precise embodiment shown and described but may be varied therefrom to include other modifications and embodiments within the scope of the claims.

Having thus described the invention, I claim:

1. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, and means for substantially preventing passage of current through the manifesting device under normal conditions.

2. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, and a balancing circuit to substantially prevent passage of current through the manifesting device under normal conditions.

3. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, and an additional voltage source connected with the manifesting device to render the latter unresponsive to normal currents in the ground circuit.

4. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, an additional voltage source connected with the terminals of the manifesting device, and adjusting means for said source to maintain the potential difference between the terminals of the manifesting device substantially zero under normal conditions.

5. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, an additional alternating current source connected with the terminals of the manifesting device to form a balancing circuit, and means for adjusting the phase and magnitude of currents in the balancing circuit to substantially prevent the flow of current through the manifesting device under normal conditions.

6. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, rectifying means associated with the manifesting device, an additional source of voltage, a balancing circuit through which said additional source is connected with the manifesting device, and adjusting means for the balancing circuit to substantially prevent passage of current through the manifesting device under normal conditions.

7. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, rectifying means associated with the manifesting device, an additional source of alternating voltage, a second rectifying means for said additional source, connections between said second rectifying means and the terminals of the manifesting device, and adjusting means for maintaining the potential difference between the terminals of the manifesting device substantially zero under normal conditions.

8. In a signaling system comprising a conductor forming a normally closed loop, means for energizing the loop by direct current, an alternating current source connected between said conductor and ground, signal formulating devices in the loop and having provision for signaling through ground, a manifesting device for signals transmitted through ground, the loop having admittance to ground whereby current flows through the ground circuit under normal conditions, a rectifier associated with the manifesting device, an additional alternating voltage source having a balancing circuit connected therewith, a second rectifying unit for the balancing circuit, and connections between the balancing circuit and the manifesting device to render the latter unresponsive to normal currents in the ground circuit.

ARTHUR C. DONOVAN, Jr.